(12) United States Patent
Takahashi et al.

(10) Patent No.: US 9,995,389 B2
(45) Date of Patent: Jun. 12, 2018

(54) CONTINUOUSLY VARIABLE TRANSMISSION CONTROL DEVICE AND CONTROL METHOD

(71) Applicants: JATCO Ltd, Fuji-shi, Shizuoka (JP); NISSAN MOTOR CO., LTD., Yokohama-shi, Kanagawa (JP)

(72) Inventors: Seiichiro Takahashi, Isehara (JP); Tomoaki Honma, Isehara (JP); Yuta Suzuki, Sagamihara (JP); Itaru Shinohara, Atsugi (JP)

(73) Assignees: JATCO Ltd, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 0 days. days.

(21) Appl. No.: 15/525,634

(22) PCT Filed: Oct. 23, 2015

(86) PCT No.: PCT/JP2015/079914
§ 371 (c)(1),
(2) Date: May 10, 2017

(87) PCT Pub. No.: WO2016/076098
PCT Pub. Date: May 19, 2016

(65) Prior Publication Data
US 2017/0321802 A1   Nov. 9, 2017

(30) Foreign Application Priority Data

Nov. 13, 2014   (JP) ................................. 2014-230834

(51) Int. Cl.
*F16H 61/662*   (2006.01)
*F16H 9/18*   (2006.01)
*F16H 61/00*   (2006.01)

(52) U.S. Cl.
CPC ......... *F16H 61/66272* (2013.01); *F16H 9/18* (2013.01); *F16H 61/0021* (2013.01)

(58) Field of Classification Search
CPC ... F16H 61/66272; F16H 61/0021; F16H 9/18
See application file for complete search history.

(56) References Cited

U.S. PATENT DOCUMENTS

| 2011/0071740 A1* | 3/2011 | Nihei | .................... F16D 48/066 701/54 |
| 2017/0172254 A1* | 6/2017 | Aveni | ................. A43B 23/0245 |

(Continued)

FOREIGN PATENT DOCUMENTS

JP   2004-100736 A   4/2004

*Primary Examiner* — David J Hlavka
(74) *Attorney, Agent, or Firm* — Foley & Lardner LLP

(57) ABSTRACT

A continuously variable transmission (100), wherein pressure equalization control is performed to make line pressure (PL) equal to secondary pressure (Psec) when prescribed start conditions are satisfied. During pressure equalization control, a secondary pressure indicated value (Psec_co) is raised by a prescribed amount (S10), then a line pressure indicated value (PL_co) is gradually decreased (S30). If determination is made that line pressure is the same as the secondary pressure after secondary actual pressure (Psec) is lowered (S40), then the line pressure is controlled so that the secondary actual pressure (Psec) becomes the secondary pressure indicated value (Psec_co) (S50). At the start of pressure equalization control, if the difference (ΔPsec) found by subtracting the secondary pressure indicated value from the secondary actual value is negative (S120), then a primary pressure indicated value is corrected on the basis of the difference (S130).

7 Claims, 5 Drawing Sheets

(56) References Cited

U.S. PATENT DOCUMENTS

2017/0211701 A1* 7/2017 Honma ............. F16H 61/66272
2017/0321802 A1* 11/2017 Takahashi ......... F16H 61/66272
2018/0017156 A1* 1/2018 Kato ....................... F16H 59/54

* cited by examiner

FIG. 7
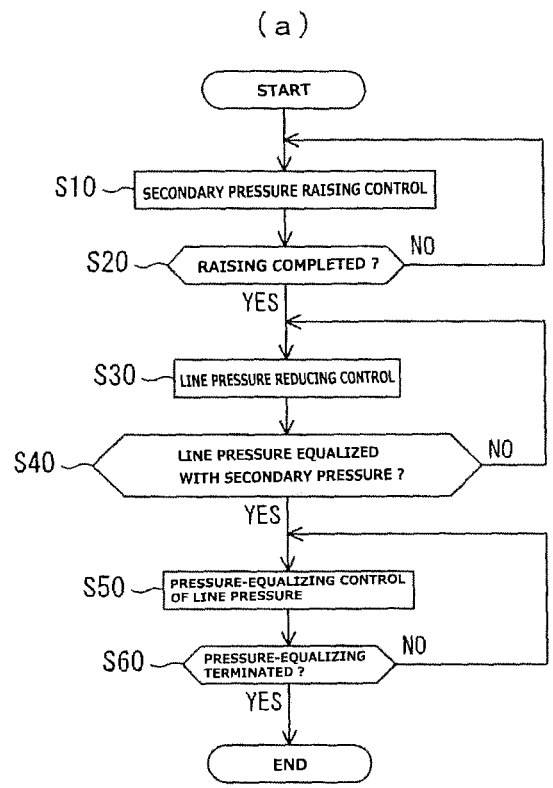
(a)
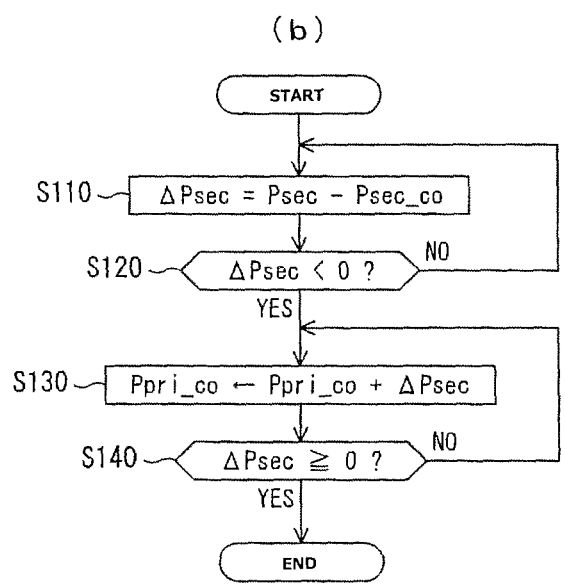
(b)

CONTINUOUSLY VARIABLE TRANSMISSION CONTROL DEVICE AND CONTROL METHOD

TECHNICAL FIELD

The present invention relates to a control device and a control method for a belt-type continuously variable transmission configured to continuously shift and output a rotational speed of a drive source of a vehicle such as an engine or motor.

BACKGROUND ART

A belt-type continuously variable transmission (henceforth referred to as CVT) is composed of a primary pulley at an input side, a secondary pulley at an output side, and a belt, wherein a torque of an engine is inputted to the input side, and the output side outputs a torque to road wheels, and the belt is wound between the primary pulley and the secondary pulley. Each of the primary pulley and the secondary pulley includes a fixed pulley and a movable pulley which form a V-shaped groove. Each movable pulley is biased toward the fixed pulley by a primary pulley pressure (henceforth referred also as primary pressure) or secondary pulley pressure (henceforth referred also as secondary pressure) produced from a line pressure as an original pressure. The belt is thus sandwiched by the pulleys, to transmit power between the primary pulley and the secondary pulley.

Incidentally, it is known that fuel efficiency is influenced significantly by height of the line pressure, because the line pressure is generated from a discharge pressure of an oil pump as an original pressure. Furthermore, if the line pressure is unnecessarily high, it becomes a factor for increasing friction at a rotating part or sliding part of the transmission. Accordingly, a technique has been proposed conventionally, which is configured to reduce the line pressure down to a required pulley pressure, and thereby reduce the discharge pressure of the oil pump and reduce the friction, and thereby enhance the fuel efficiency.

For example, a patent document 1 describes a line pressure control device configured to set a target line pressure to a higher value of a required primary pressure and a required secondary pressure, and thereby regulate the line pressure to a minimum required value, and thereby enhance the fuel efficiency effect. At a high side where the primary pressure is higher than the secondary pressure, this technique is further configured to prevent the line pressure control from being affected by errors of attachment of a shift actuator, and thereby prevent the line pressure from being corrected unnecessarily, and thereby suppress the fuel efficiency from being adversely affected by excessive increase of the line pressure, and suppress the occurrence of a failure to establish a target transmission ratio due to shortage of line pressure.

Incidentally, in patent document 1, the required secondary pressure is determined based on an actual transmission ratio and an input torque, and a feedback control is performed based on a deviation from an actual secondary pulley pressure sensed by a sensor. Namely, a pressure reducing valve, which is disposed in an oil passage connected to a secondary pulley chamber, is controlled by feedback control, to conform the actual secondary pulley pressure to the required secondary pressure.

The technique disclosed in patent document 1, which is configured to control the line pressure to equalize the line pressure with the required primary pressure, is effective especially when the transmission ratio is at the high side. In the entire region of transmission ratio, the friction can be reduced by controlling the line pressure to equalize the line pressure with the required secondary pressure also when the transmission ratio is at a low side. Namely, the control of the line pressure to conform the line pressure to the higher pulley pressure of the primary pressure and the secondary pressure, is effective for enhancing the fuel efficiency effect while ensuring the minimum required line pressure.

Incidentally, in general, in a CVT, the pulley pressure is controlled to a command value (i.e. pulley pressure command value) by feedback control. For implementing the feedback control, a pulley pressure sensor is provided to sense the pulley pressure. For example, when the line pressure is controlled to the secondary pressure with the transmission ratio at the low side, control of the line pressure to a secondary pressure command value is effective for enhancing the fuel efficiency effect. However, when no oil pressure sensor is provided to sense an actual line pressure, the actual line pressure cannot be obtained directly. The actual line pressure and actual secondary pressure are used to refer to quantities obtained by oil pressure sensors.

In view of the foregoing, it is effective to proactively control the line pressure command value to equalize the actual line pressure with the actual secondary pressure (referred to as pressure-equalizing control), and thereby conform a sensed value, which is obtained by a pulley pressure sensor (secondary pressure sensor) sensing the actual secondary pressure, to the actual line pressure, and control the sensed value of the secondary pressure sensor to the secondary pressure command value by feedback control.

If the pressure-equalizing control to equalize the line pressure with the secondary pressure is performed during feedback control of the secondary pressure, this may be implemented by reducing the line pressure command value from a current value. Namely, since an upper limit of the secondary pressure is restricted by the line pressure, the sensible secondary pressure is reduced with decrease of the line pressure by reducing the line pressure command value, and thereby reducing the line pressure. Accordingly, when the decrease of the actual secondary pressure is determined as the line pressure command value is reduced, it can be determined that the line pressure has been equalized with the secondary pressure.

Once the pressure-equalized condition is determined (pressure-equalization determination), the actual secondary pressure can be regarded as equal to the actual line pressure thereafter. Accordingly, after the pressure-equalization determination, it is possible to reflect a controlled quantity (i.e. feedback correction quantity), which is to be feedback-controlled to conform the actual secondary pressure to the target secondary pressure, on the control of the line pressure command value, and thereby adjust the secondary pressure to the target secondary pressure by this line pressure control while maintaining the line pressure and the secondary pressure to be equalized with each other.

The pressure-equalization determination causes a decrease of the secondary pressure, because the pressure-equalization determination is in response to decrease of the actual secondary pressure as the line pressure command value is reduced. Furthermore, in general, sensed value of the oil pressure sensor that senses the actual secondary pressure as a factor for the determination are unstable with (harmonic) oscillating components. Even if a low-pass filter is used to remove the oscillating components from the sensed value of the oil pressure sensor, it is impossible to determine the pressure-equalized condition unless the actual secondary pressure is reduced by some quantity.

The decrease of the actual secondary pressure may cause the belt to slip. In order to prevent the slip, in consideration of the decrease of the secondary pressure required for the pressure-equalization determination, a control to proactively raise the secondary pressure by the quantity of decrease of the secondary pressure is performed, immediately before the reduction of the line pressure command value. Namely, the pressure-equalizing control is implemented by: first increasing the secondary pressure command value by a predetermined quantity; and when the actual secondary pressure has increased by the predetermined quantity, reducing the line pressure command value; and when the actual secondary pressure has thereby decreased to the state before the secondary pressure command value is increased by the predetermined quantity, determining that pressure-equalized condition is determined; and thereafter controlling the line pressure to conform the actual secondary pressure to the secondary pressure command value with the actual secondary pressure regarded as the actual line pressure.

However, it has been found that when the pressure-equalizing control is performed in this way, the transmission ratio fluctuates unstably while the secondary pressure is reduced by lowering the line pressure command value. By consideration of a mechanism causing the phenomenon, the following can be assumed.

During the pressure-equalizing control, at the primary pulley side, the primary pressure is also feedback-controlled to conform the actual transmission ratio, which is obtained by the rotational speed of the primary pulley and the rotational speed of the secondary pulley sensed by respective rotation sensors, to the target transmission ratio. As the secondary pressure is reduced as described above, the pulley diameter of the secondary pulley changes in the decreasing direction, thereby changing the actual transmission ratio to the high side. In response to this change, the primary pressure command value is reduced to suppress the change of the actual transmission ratio to the high side. However, it is conceivable that since the feedback control of the primary pressure has a response delay, the change of the actual transmission ratio to the high side cannot be suppressed sufficiently, but the fluctuation of the actual transmission ratio becomes large.

The present invention is made in view of the foregoing problems. It is an object of the present invention to provide a continuously variable transmission control device and a continuously variable transmission control method which allow to enhance the fuel efficiency by controlling the line pressure to the minimum required value, and suppress the resulting occurrence of unstable fluctuation of the transmission ratio. In addition, it may be regarded as other objects of the present invention to produce advantageous effects which result from configurations of embodiments of the present invention described below and cannot be obtained by conventional technology.

PRIOR ART DOCUMENT(S)

Patent Document(s)

Patent Document 1: JP 2004-100736 A

SUMMARY OF THE INVENTION (1) According to the present invention, a continuously variable transmission control device for a continuously variable transmission, wherein the continuously variable transmission includes a primary pulley at an input side, a secondary pulley at an output side, and a belt wound around the primary pulley and the secondary pulley, the continuously variable transmission control device comprises: a secondary pressure control means configured to: set a secondary pressure command value, wherein the secondary pressure command value is a command value of a secondary pressure supplied to the secondary pulley; and control the secondary pressure on a basis of the secondary pressure command value; a secondary pressure sensing means configured to sense an actual secondary pressure, wherein the actual secondary pressure is an actual oil pressure supplied to the secondary pulley; a primary pressure control means configured to: set a primary pressure command value on a basis of a target transmission ratio, wherein the primary pressure command value is a command value of a primary pressure supplied to the primary pulley; and control the primary pressure on a basis of the primary pressure command value; and a line pressure control means configured to: set a line pressure command value on a basis of one of the secondary pressure command value and the primary pressure command value, wherein the line pressure command value is a command value of a line pressure; and control the line pressure on a basis of the line pressure command value; wherein an action is performed while a pressure-equalizing control is being performed during a period from a satisfaction of a predetermined start condition to a satisfaction of a predetermined termination condition, wherein the predetermined start condition includes being in a state of operation where the secondary pressure command value is higher than the primary pressure command value, and wherein the pressure-equalizing control is to equalize an actual oil pressure of the line pressure with the actual secondary pressure; and wherein the action includes: causing the line pressure control means to reduce the line pressure command value gradually; controlling the line pressure in a manner to conform the actual secondary pressure to the secondary pressure command value, in response to a determination based on a decrease of the actual secondary pressure that the actual oil pressure of the line pressure has become equal to the actual secondary pressure; and causing the primary pressure control means to calculate a difference between the secondary pressure command value and the actual secondary pressure by subtracting the secondary pressure command value from the actual secondary pressure, and control the primary pressure by performing a pressure-equalizing-control-condition correction control when the difference is negative, wherein the pressure-equalizing-control-condition correction control includes correcting the primary pressure command value on a basis of the difference. In a preferable form, the secondary pressure control means is configured to set the secondary pressure command value on a basis of a required torque transmission capacity; and the action, performed while the pressure-equalizing control is being performed, includes: causing the secondary pressure control means to perform a raising operation to raise the secondary pressure command value by a predetermined quantity; causing the line pressure control means to reduce the line pressure command value gradually, in response to a determination based on the actual secondary pressure that the raising operation is completed; causing the line pressure control means to control the line pressure in a manner to conform the actual secondary pressure to the secondary pressure command value, in response to a determination based on a decrease of the actual secondary pressure that the actual oil pressure of the line pressure has become equal to the actual secondary pressure; and at and after start of the pressure-equalizing control, causing the primary pressure control means to calculate the difference between the secondary pressure command value and the actual secondary pressure by subtracting the secondary pressure command value from the actual secondary pressure, and perform the pressure-equalizing-control-condition correction control when the difference is negative.

(2) It is preferable that the primary pressure control means is configured to implement the pressure-equalizing-control-condition correction control by correcting the primary pressure command value in a manner to reduce the primary pressure command value by adding the difference to the primary pressure command value when the difference is negative.

(3) It is preferable that the primary pressure control means is configured to terminate the pressure-equalizing-control-condition correction control in response to a combination of a determination of a decrease of the actual secondary pressure and a condition that the difference has become positive, after start of the pressure-equalizing-control-condition correction control.

(4) It is preferable that: during the pressure-equalizing control, the determination that the actual oil pressure of the line pressure has become equal to the actual secondary pressure is made in response to a condition that the difference is negative and has a magnitude higher than or equal to a predetermined value; and the predetermined quantity to raise the secondary pressure command value is set on a basis of the predetermined value.

(5) It is preferable that the actual secondary pressure used in each of the controls is a quantity obtained by low-pass filtering a value sensed by the secondary pressure sensing means.

(6) According to the present invention, a continuously variable transmission control method for a continuously variable transmission, wherein: the continuously variable transmission includes a primary pulley at an input side, a secondary pulley at an output side, a belt wound around the primary pulley and the secondary pulley, a secondary pressure control means for controlling a secondary pressure, a primary pressure control means for controlling a primary pressure, a line pressure control means for controlling a line pressure, and a pressure-equalizing control means for performing a pressure-equalizing control to equalize an actual oil pressure of the line pressure with an actual secondary pressure; the secondary pressure control means is configured to: set a secondary pressure command value on a basis of a required torque transmission capacity, wherein the secondary pressure command value is a command value of the secondary pressure supplied to the secondary pulley; and control the secondary pressure on a basis of the secondary pressure command value; the primary pressure control means is configured to: set a primary pressure command value on a basis of a target transmission ratio, wherein the primary pressure command value is a command value of the primary pressure supplied to the primary pulley; and control the primary pressure on a basis of the primary pressure command value; the line pressure control means is configured to: set a line pressure command value on a basis of one of the secondary pressure command value and the primary pressure command value, wherein the line pressure command value is a command value of the line pressure; and control the line pressure on a basis of the line pressure command value; and the continuously variable transmission control method comprises: performing the pressure-equalizing control during a period from a satisfaction of a predetermined start condition to a satisfaction of a predetermined termination condition, wherein the predetermined start condition includes being in a state of operation where the secondary pressure is higher than the primary pressure; performing an action during the pressure-equalizing control, wherein the action includes in sequence: a secondary pressure raising step of causing the secondary pressure control means to raise the secondary pressure command value by a predetermined quantity; a line pressure reducing step of: sensing the actual secondary pressure, wherein the actual secondary pressure is an actual oil pressure supplied to the secondary pulley; and causing the line pressure control means to reduce the line pressure command value gradually, in response to a determination based on the actual secondary pressure that the secondary pressure raising step is completed; and a line pressure control step of causing the line pressure control means to control the line pressure in a manner to conform the actual secondary pressure to the secondary pressure command value, in response to a determination based on a decrease of the actual secondary pressure that the actual oil pressure of the line pressure has become equal to the actual secondary pressure; and while the pressure-equalizing control is being performed, causing the primary pressure control means to calculate a difference between the secondary pressure command value and the actual secondary pressure by subtracting the secondary pressure command value from the actual secondary pressure, and control the primary pressure by performing a pressure-equalizing-control-condition correction control when the difference is negative, wherein the pressure-equalizing-control-condition correction control includes correcting the primary pressure command value on a basis of the difference.

According to the present invention, although the actual secondary pressure decreases and the decrease is likely to cause unstable fluctuation of the transmission ratio while the pressure-equalizing control is being performed, this unstable fluctuation of the transmission ratio can be suppressed by determining based on decrease of the actual secondary pressure that the actual oil pressure of the line pressure has been equalized with the actual secondary pressure, and when the actual secondary pressure decreases below the secondary pressure command value, controlling the primary pressure by correcting the primary pressure command value based on the decrease (difference) of the secondary pressure.

BRIEF DESCRIPTION OF THE DRAWINGS

FIG. 7 is a flow chart illustrating the pressure-equalizing control performed by the continuously variable transmission control device according to the embodiment of the present invention, wherein (a) shows a flow chart of the pressure-equalizing control including a line pressure control as main part, and (b) shows a flow chart of a primary pressure control of pressure-equalizing-control-condition correction control.

MODE(S) FOR CARRYING OUT THE INVENTION

The following describes an embodiment of the present invention in detail with reference to the drawings. The embodiment described below is merely an example, without intention to exclude various modifications and technical adaptions which are not explicitly shown in the embodiment. Each configuration of the embodiment can be carried out with various modifications without going out of the substance, and adopted or excluded as required, and combined as desired.

In oil controls described below, a line pressure, a primary pressure, and a secondary pressure are controlled. An actual value of each oil pressure is referred to as actual line pressure, actual primary pressure, or actual secondary pressure, wherein the actual primary pressure and the actual secondary pressure are quantities sensed by sensors. The primary pressure and the secondary pressure are provided with target values, which are referred to as primary pressure target value and secondary pressure target value respectively. Furthermore, command values for commanding to conform the primary pressure and the secondary pressure to the primary pressure target value and the secondary pressure target value respectively, are referred to as primary pressure command value and secondary pressure command value respectively. A command value for the line pressure is referred to as line pressure command value.

[1. Entire System Configuration]

Figure 1:
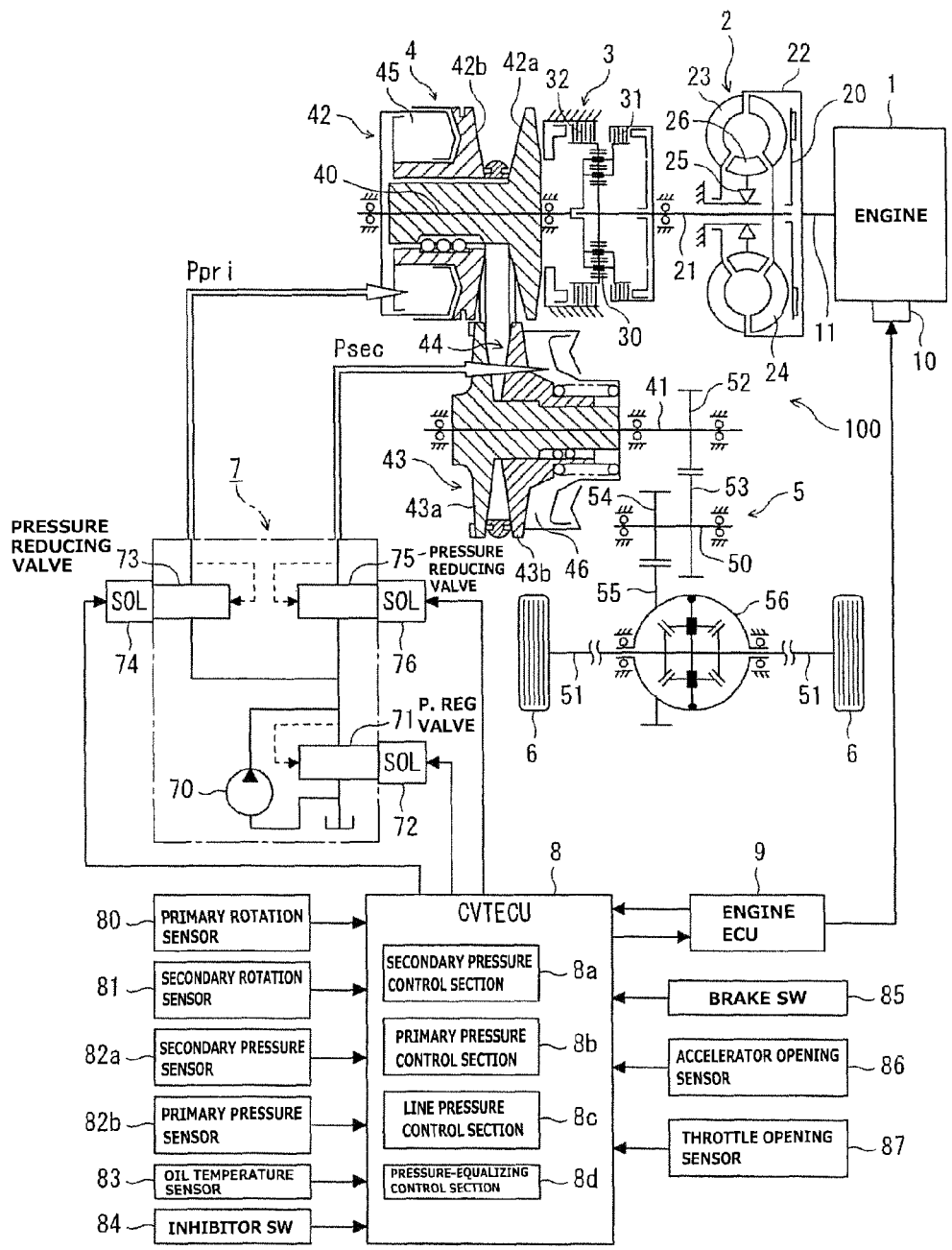
FIG. 1 is an entire system diagram showing a drive system and a control system of an engine vehicle to which a continuously variable transmission control device according to an embodiment of the present invention is applied.

FIG. 1 is an entire system diagram showing a drive system and a control system of a vehicle to which a control device according to the present embodiment is applied. As shown in FIG. 1, the drive system of the vehicle includes an engine (internal combustion engine) 1 as a drive source, a torque converter 2, a forward-rearward switching mechanism 3, a belt-type continuously variable transmission mechanism 4, a final reduction mechanism 5, and driving wheels 6, 6. Torque converter 2, forward-rearward switching mechanism 3, belt-type continuously variable transmission mechanism 4, and final reduction mechanism 5 are housed in a transmission case, to form a belt-type continuously variable transmission 100 (henceforth referred to as CVT 100).

Engine 1 is equipped with an output torque control actuator 10 configured to perform an output torque control by opening and closing operation of a throttle valve and fuel cut operation and others. With this configuration, the output torque of engine 1 can be controlled not only by driver's accelerator operation, but also by an engine control signal from the outside.

Torque converter 2 is a starting element having a torque-boosting function, and includes a lockup clutch 20 configured to connect an engine output shaft 11 (i.e. torque converter input shaft) directly to a torque converter output shaft 21 when the torque-boosting function is not required. Torque converter 2 includes is composed of a pump impeller 23, a turbine runner 24, and a stator 26, wherein pump impeller 23 is connected to engine output shaft 11 via a converter housing 22, and turbine runner 24 is connected to torque converter output shaft 21, and stator 26 is provided to the case via a one-way clutch 25.

Forward-rearward switching mechanism 3 is a mechanism to switch the direction of input rotation to belt-type continuously variable transmission mechanism 4, i.e. to a normal rotational direction for forward drive and to a reverse rotational direction for rearward drive. Forward-rearward switching mechanism 3 includes a planetary gear mechanism 30, a forward-drive clutch 31, and a rearward-drive brake 32, wherein forward-drive clutch 31 is composed of a plurality of clutch plates, and rearward-drive brake 32 is composed of a plurality of brake plates. Planetary gear mechanism 30 is, for example, of a double-pinion type, including a sun gear connected to torque converter output shaft 21, and a carrier connected to a transmission input shaft 40. During forward drive, forward-drive clutch 31 is engaged to connect the sun gear and the carrier of planetary gear mechanism 30 directly to each other. During rearward drive, rearward-drive brake 32 is engaged to fix a ring gear of planetary gear mechanism 30 to the case.

Belt-type continuously variable transmission mechanism 4 has a continuously variable transmission function to vary continuously a transmission ratio that is a ratio between the input rotational speed of transmission input shaft 40 and the output rotational speed of transmission output shaft 41 ([transmission input rotational speed]/[transmission output rotational speed]), by varying belt contact diameters. Belt-type continuously variable transmission mechanism 4 includes a primary pulley 42, a secondary pulley 43, and a belt 44, and is controlled by oil pressure of working oil (ATF: Automatic Transmission Fluid).

Primary pulley 42 includes a fixed pulley 42a and a slide pulley 42b. Slide pulley 42b is configured to slide and move in an axial direction by a primary pressure (referred to also as primary pulley pressure) Ppri introduced to a primary oil pressure chamber 45. Secondary pulley 43 includes a fixed pulley 43a and a slide pulley 43b. Slide pulley 43b is configured to slide and move in an axial direction by a secondary pressure (referred to also as secondary pulley pressure) Psec introduced to a secondary oil pressure chamber 46.

Surfaces of fixed pulley 42a and slide pulley 42b of primary pulley 42 facing each other are sheave surfaces forming a V-shape, and surfaces of fixed pulley 43a and slide pulley 43b of secondary pulley 43 facing each other are sheave surfaces forming a V-shape. Flank surfaces of belt 44 at its sides are in contact with the sheave surfaces. Namely, belt 44 is wound around the V-shaped sheave surfaces of primary pulley 42, and the V-shaped sheave surfaces of secondary pulley 43. Movement of each slide pulley 42b, 43b causes a change in diameter of winding of belt 44 around primary pulley 42 or secondary pulley 43, and thereby causes a change in the transmission ratio. Belt 44 may be implemented by connecting multiple pieces by an endless belt, or by a rubber belt, or by a chain.

Final reduction mechanism 5 is a mechanism to reduce the transmission output rotational speed from transmission output shaft 41 of belt-type continuously variable transmission mechanism 4, and perform a differential function, and transmit same to left and right driving wheels 6, 6. Final reduction mechanism 5 is disposed between transmission output shaft 41 and left and right drive shafts 51, 51, and includes a first gear 52, a second gear 53, a third gear 54, a final reduction gear 55, and a differential gear 56, wherein first gear 52 is provided at transmission output shaft 41, and second gear 53 and third gear 54 are provided at an idler shaft 50, and differential gear 56 has a differential function.

In the control system of the vehicle, CVT 100 includes a control system including a speed-changing oil pressure control unit 7, and a CVT electronic control unit 8 (controller, henceforth referred to as CVTECU 8), as shown in FIG. 1. An engine control unit 9 (henceforth referred to as engine ECU 9) is further provided, which exchanges information with CVTECU 8. Each electronic control unit (ECU) 8, 9 is composed of input and output devices, a memorizing device (ROM, RAM, etc.), a central processing unit (CPU), a timer counter, etc., wherein the memorizing device stores a lot of control programs.

Oil pressure control unit 7 is configured to generate primary pressure Ppri introduced to primary oil pressure chamber 45, and generate secondary pressure Psec introduced to secondary oil pressure chamber 46. Oil pressure control unit 7 includes an oil pump 70, a regulator valve 71, a line pressure solenoid 72, a primary pressure reducing valve 73, a primary pressure solenoid 74, a secondary pressure reducing valve 75, and a secondary pressure solenoid 76.

Regulator valve 71 is a valve to regulate a line pressure based on a discharge pressure of oil pump 70 as an original pressure. Regulator valve 71 is driven by line pressure solenoid 72, and receives an oil pressure sent under pressure from oil pump 70, and regulates same to a predetermined line pressure based on a command from CVT control unit 8.

Primary pressure reducing valve 73 and secondary pressure reducing valve 75 are valves to regulate primary pressure Ppri introduced to primary oil pressure chamber 45 and regulate secondary pressure Psec introduced to secondary oil pressure chamber 46 respectively, based on the line pressure produced as an original pressure by regulator valve 71. These pressure reducing valves 73, 75 are driven by primary pressure solenoid 74 and secondary oil pressure solenoid 76 respectively, and perform controls to obtain specific primary pressure Ppri and specific secondary pressure Psec respectively by reduction from the line pressure in response to a command from CVT control unit 8.

CVT control unit 8 is connected to various sensors including a primary rotation sensor 80, a secondary rotation sensor 81, a secondary pressure sensor 82*a*, a primary pressure sensor 82*b*, an oil temperature sensor 83, an inhibitor switch 84, a vehicle brake switch 85, a vehicle accelerator opening sensor 86, and a vehicle throttle opening sensor 87, and receives input of information from the sensors and switches, wherein primary rotation sensor 80 senses a rotational speed (number of rotations per unit time) Npri of primary pulley 42, and secondary rotation sensor 81 senses a rotational speed (number of rotations per unit time) Nsec of secondary pulley 43, and secondary pressure sensor 82*a* senses secondary pressure Psec, and primary pressure sensor 82*b* senses primary pressure Ppri, and oil temperature sensor 83 senses a temperature OT of working oil, and inhibitor switch 84 senses a shift position. CVTECU 8 receives input of torque information from engine ECU 9, and outputs a torque request to engine ECU 9. The sensed values of secondary pressure sensor 82*a* and primary pressure sensor 82*b* are processed by low-pass filters not shown to remove very small (harmonic) oscillating components, and then are used in controls by CVT control unit 8.

CVTECU 8 performs: a line pressure control to output a predetermined control command (line pressure command value) to line pressure solenoid 72; a secondary pressure control to output a control command (secondary pressure command value Psec_co) to secondary oil pressure solenoid 76 to achieve a predetermined secondary pressure target value Psec_tg; a primary pressure control to output a control command (primary pressure command value Ppri_co) to primary oil pressure solenoid 74 to achieve a predetermined primary pressure target value Ppri_tg; a forward-rearward switching control to control engagement and disengagement of forward-drive clutch 31 and rearward-drive brake 32; and others.

CVTECU 8 includes as functional elements a secondary pressure control section (secondary pressure control means) 8*a*, a primary pressure control section (primary pressure control means) 8*b*, and a line pressure control section (line pressure control means) 8*c*, which are configured to control the secondary pressure Psec, the primary pressure Ppri, and the line pressure, respectively. CVTECU 8 includes a pressure-equalizing control section (pressure-equalizing control means) 8*d* as a functional element, which is configured to perform a pressure-equalizing control through these secondary pressure control section 8*a*, primary pressure control section 8*b*, and line pressure control section 8*c*, wherein the pressure-equalizing control characterizes the present device.

First, the following describes basic setting of secondary pressure command value Psec_co, primary pressure command value Ppri_co, and line pressure command value PL_co. Secondary pressure control section 8*a* is configured to calculate a capacity of torque transmitted by belt-type continuously variable transmission mechanism 4, based on information from engine ECU 9, and determine secondary pressure target value Psec_tg based on the transmission torque capacity, and set the secondary pressure command value Psec_co. Secondary pressure command value Psec_co is set by adding a feedback correction quantity to secondary pressure target value Psec_tg, wherein the feedback correction quantity is based on actual secondary pressure Psec. Accordingly, secondary pressure target value Psec_tg is equal to a secondary pressure command value before oil pressure FB (feedback), and secondary pressure command value Psec_co is equal to a secondary pressure command value after the oil pressure FB.

Primary pressure control section 8*b* is configured to receive information about target transmission ratio from engine ECU 9, and set the primary pressure target value Ppri_tg based on the target transmission ratio, and an actual transmission ratio (calculated from rotational speed Npri of primary pulley 42 and rotational speed Nsec of secondary pulley 43), and secondary pressure command value Psec_co, and set the primary pressure command value Ppri_co based on primary pressure target value Ppri_tg and actual primary pressure Ppri.

Line pressure control section 8*c* is configured to set the line pressure command value PL_co based on secondary pressure command value Psec_co and primary pressure command value Ppri_co. In a normal line pressure control, line pressure command value PL_co is set to a larger one of a first value obtained by adding a pressure margin $\alpha$ to secondary pressure command value Psec_co (=Psec_co+$\alpha$) and a second value obtained by adding a pressure margin $\beta$ to primary pressure command value Ppri_co (=Ppri_co+$\beta$), based on secondary pressure command value Psec_co and primary pressure command value Ppri_co, as shown below in equation (1). These adding operations of pressure margins $\alpha$, $\beta$ are referred to also as line pressure offset, and pressure margins $\alpha$, $\beta$ are referred to also as offset quantities. Secondary pressure command value Psec_co may be the secondary pressure command value before the oil pressure FB (=secondary pressure target value Psec_tg) or the secondary pressure command value Psec_co after the oil pressure FB which is obtained by correcting the secondary pressure command value before the oil pressure FB by the oil pressure feedback quantity. Here, when the secondary pressure command value before the oil pressure FB (=secondary pressure target value Psec_tg) is larger than secondary pressure command value Psec_co, the secondary pressure command value before the oil pressure FB, Psec_tg, is used as the secondary pressure command value before and after the oil pressure FB, Psec_tg.

$$PL\_co = MAX[(Psec\_co + \alpha), (Ppri\_co + \beta)] \qquad (1)$$

Figure 3:
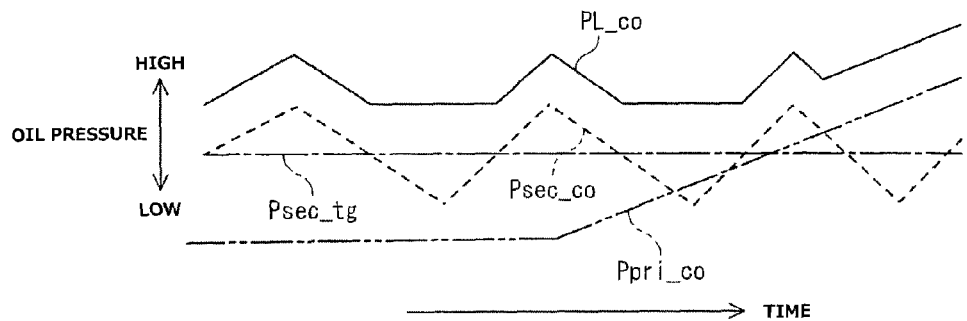
FIG. 3 is a time chart illustrating a line pressure command value set by the continuously variable transmission control device according to the embodiment of the present invention.

FIG. 3 is a time chart showing the line pressure command value PL_co, which is set based on secondary pressure command value Psec_co and primary pressure command value Ppri_co, wherein a long-dashed short-dashed line represents the secondary pressure target value (secondary pressure command value before oil pressure FB) Psec_tg, a broken line represents the secondary pressure command value (secondary pressure command value after oil pressure FB) Psec_co, a long-dashed double short-dashed line represents the primary pressure command value Ppri_co, and a solid line represents the line pressure command value PL_co. By thus setting the line pressure command value PL_co with margins with respect to secondary pressure command value Psec_co and primary pressure command value Ppri_co, the secondary pressure Psec and primary pressure Ppri can be reliably conformed to secondary pressure command value Psec_co and primary pressure command value Ppri_co.

[2. Pressure-Equalizing Control]
[2-1. Line Pressure Control]

The line pressure control includes a normal line pressure control and a pressure-equalizing control, wherein the normal line pressure control is configured to set line pressure command value PL_co based on the pulley pressures, namely, based on primary pressure command value Ppri_co and secondary pressure command value Psec_co, and wherein the pressure-equalizing control is performed in response to a satisfaction of a predetermined start condition.

The following describes the pressure-equalizing control in detail. The pressure-equalizing control is configured to reduce the line pressure PL to a required pulley pressure, and then equalize the line pressure PL with the required pulley pressure. This serves to reduce the discharge pressure of oil pump 70, and reduce the friction, and thereby enhance the fuel efficiency. The required pulley pressure is a higher oil pressure of secondary pressure Psec and primary pressure Ppri, namely, an oil pressure value of the higher one of secondary pressure command value Psec_co and primary pressure command value Ppri_co on which the pressure margins $\alpha$, $\beta$ are not reflected. Namely, during the pressure-equalizing control, the line pressure PL is lowered to the oil pressure of the higher one of secondary pressure command value Psec_co and primary pressure command value Ppri_co, and the line pressure PL is introduced into primary oil pressure chamber 45 or secondary oil pressure chamber 46 without regulation by pressure reducing valve 73, 75.

The following describes the pressure-equalizing control to equalize the line pressure PL with secondary pressure Psec in detail. This pressure-equalizing control (pressure-equalizing control to the secondary pressure) is started in response to a satisfaction of a predetermined start condition, for example, a satisfaction of all of the following conditions (A) to (C).

(A) The state of operation of CVT 100 is in a region of low vehicle speed and high rotational speed.
(B) Temperature OT is higher than or equal to a predetermined temperature OT0 (OT≥OT0).
(C) Secondary pressure command value Psec_co is larger than or equal to a predetermined value (Psec_co≥predetermined value).

Figure 4:
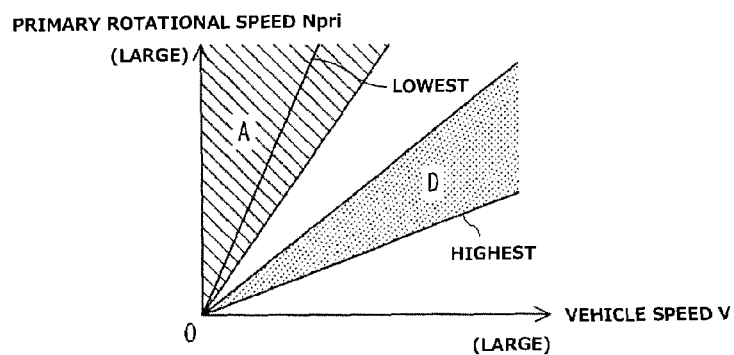
FIG. 4 shows an example of map for determining a start condition for a pressure-equalizing control performed by the continuously variable transmission control device according to the embodiment of the present invention.

The condition (A) is determined by using a map as shown in FIG. 4 which is memorized beforehand in CVTECU 8, for example. The primary rotational speed Npri sensed by primary rotation sensor 80 and vehicle speed V calculated from secondary rotational speed Nsec sensed by secondary rotation sensor 81 are applied to the map of FIG. 4. When it is in a state of operation in a region A indicated by diagonally shaded pattern, it is then determined that the condition (A) is satisfied. In FIG. 4, the region of operation A indicated by diagonally shaded pattern and the region of operation D indicated by dots are shown with a transmission shift line of the lowest and a transmission shift line of the highest. In the region of operation A containing the transmission shift line of the lowest, the transmission ratio is at the low side, so that secondary pressure Psec and primary pressure Ppri are in a relationship that secondary pressure Psec is higher than primary pressure Ppri (Psec>Ppri). Accordingly, the condition (A) can be translated to a condition that secondary pressure Psec is higher than primary pressure Ppri.

The condition (B) is a condition about temperature for preventing the pressure-equalizing control when temperature OT is low. The condition (B) is determined by comparing the temperature OT sensed by oil temperature sensor 83 with predetermined temperature OT0 as a reference temperature for determination. The condition (C) is determined by comparing the secondary pressure command value Psec_co in the secondary pressure control detailed below with the predetermined value as a reference pressure for determination. The predetermined temperature OT0 and the predetermined value are set beforehand based on an oil temperature and secondary pressure with which the pressure-equalizing control can be performed.

Figure 5:
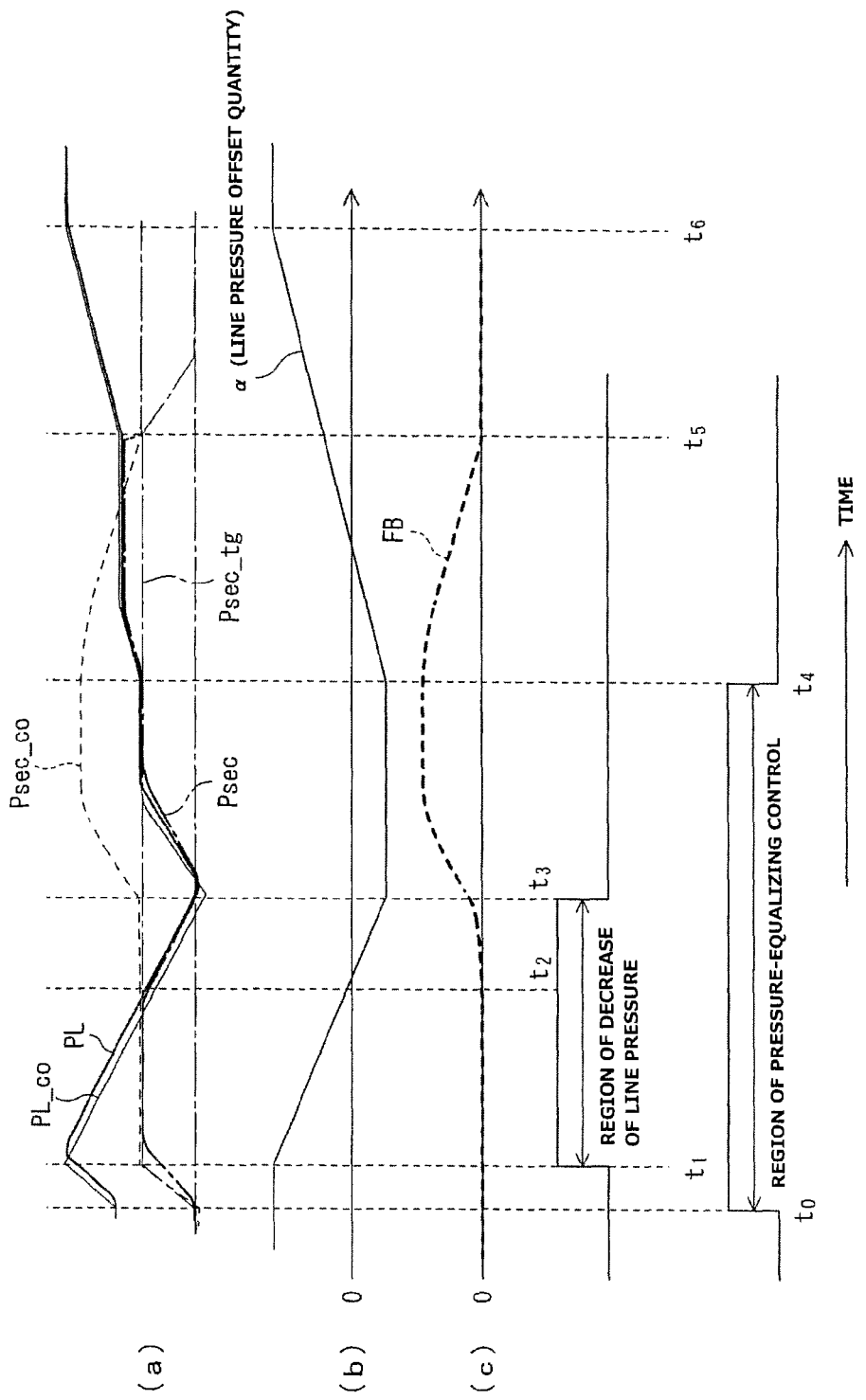
FIG. 5 is a time chart illustrating the pressure-equalizing control performed by the continuously variable transmission control device according to the embodiment of the present invention.

The following describes contents of the pressure-equalizing control with reference to a time chart of FIG. 5 and a flow chart of FIG. 7 (a). When it is determined that the start condition described above is satisfied (at a time instant t0), a pressure-equalization generating operation is started for equalizing the line pressure PL with the actual secondary pressure Psec.

Specifically, when start of the pressure-equalizing control is determined at time instant t0, as shown in FIG. 5 (a), the secondary pressure control section 8a is first caused to perform a secondary pressure raising step to raise secondary pressure command value Psec_co and thereby raise actual secondary pressure Psec by the predetermined quantity (at Step S10 in FIG. 7 (a)). Namely, by increasing the secondary pressure target value Psec_tg by the predetermined quantity, the secondary pressure command value Psec_co is raised to conform the secondary pressure Psec to secondary pressure target value Psec_tg. The predetermined quantity for the raising of the secondary pressure is described below. In this situation, the line pressure command value PL_co is normally set to a value obtained by adding the pressure margin (offset quantity) $\alpha$ to secondary pressure command value Psec_co, so that the line pressure PL rises as secondary pressure Psec rises.

Then, at a time instant t1, when it is determined based on the actual secondary pressure Psec that the raising operation is completed (at Step S20 in FIG. 7 (a)), namely, when actual secondary pressure Psec has reached the secondary pressure target value Psec_tg increased by the predetermined quantity, the line pressure control section 8c is caused to perform a line pressure reducing step to gradually reduce the line pressure command value PL_co at a predetermined gradient (at Step S30 in FIG. 7 (*a*)). The decrease of line pressure command value PL_co is implemented by reducing the pressure margin α, as shown in FIG. 5 (*b*). By this operation, line pressure command value PL_co is made to approach the secondary pressure target value Psec_tg, and further becomes lower than secondary pressure target value Psec_tg. As actual secondary pressure Psec does not become higher than line pressure (actual line pressure) PL, actual secondary pressure Psec becomes lower than secondary pressure target value Psec_tg, when actual line pressure PL is set lower than secondary pressure target value Psec_tg.

Namely, after line pressure PL becomes lower than secondary pressure target value Psec_tg at a time instant t2, actual secondary pressure Psec is put in a state able to be reduced by line pressure PL, so that actual secondary pressure Psec deviates from secondary pressure target value Psec_tg. Actual line pressure PL cannot be sensed directly, but actual secondary pressure Psec can be sensed by secondary pressure sensor 82a. Accordingly, the magnitude of this deviation (magnitude of difference ΔPsec obtained by subtracting the secondary pressure target value Psec_tg from actual secondary pressure Psec) can be calculated. This difference ΔPsec is a negative value. When the magnitude of difference ΔPsec becomes higher than or equal to a predetermined value Pc, it is determined that actual line pressure PL is equalized with actual secondary pressure Psec (at a time instant t3), and then the pressure-equalization generating operation is terminated, and this is determined (at Step S40 in FIG. 7 (*a*)).

The predetermined value Pc is preset to a value allowing to determine that actual secondary pressure Psec has deviated from secondary pressure target value Psec_tg (for example, a value larger than an amplitude of oscillation of oil pressure), and is henceforth referred to as pressure-equalization determination value Pc. This determination is referred to as pressure-equalization determination, and time instant t3 when completion of the pressure-equalization is determined is referred to as pressure-equalization completion time instant. Namely, at pressure-equalization completion time instant t3, the control to reduce the line pressure PL is terminated. The predetermined quantity for increasing the secondary pressure target value Psec_tg at the secondary pressure raising step is set identical to this predetermined value Pc. The value obtained by low-pass filtering the sensed value of secondary pressure sensor 82a becomes lower than secondary pressure target value Psec_tg at time instant t2 before pressure-equalization completion time instant t3.

After the determination of pressure-equalization completion (after time instant t3), an oil pressure feedback correction quantity FB calculated by oil pressure feedback control in the secondary pressure control described below (see FIG. 5 (*c*)) is reflected on line pressure command value PL_co, so that the actual line pressure PL (actual secondary pressure Psec sensed by secondary pressure sensor 82a) is made to approach the secondary pressure target value Psec_tg, with actual line pressure PL maintained equalized with actual secondary pressure Psec (the pressure-equalizing control for line pressure at Step S50 in FIG. 7 (*a*)).

The substantial region of pressure-equalizing control for equalizing the actual line pressure PL with actual secondary pressure Psec is until a time instant t4. After time instant t4, for terminating the pressure-equalizing control, a control is performed which is configured to increase the offset quantity of the line pressure PL gradually, and thereby bring the line pressure command value PL_co away from secondary pressure target value Psec_tg. However, even after time instant t4, until a time instant t5, oil pressure feedback correction quantity FB is reflected on line pressure command value PL_co, thereby suppressing the increase of line pressure command value PL_co. On the other hand, since line pressure command value PL_co is smaller than secondary pressure command value Psec_co, actual secondary pressure Psec is maintained equalized with actual line pressure PL until time instant t5. After time instant t5, since no oil pressure feedback correction quantity FB is present, line pressure command value PL_co and actual line pressure PL rise with the offset quantity of the line pressure PL, and deviate completely from actual secondary pressure Psec at a time instant t6. At time instant t6, the pressure-equalizing control is completely terminated (at Step S60 in FIG. 7 (*a*)), and it returns to the normal line pressure control.

The condition for terminating the pressure-equalizing control (pressure-equalizing control with secondary pressure) for equalizing the line pressure PL with secondary pressure Psec is, for example, a satisfaction of the following condition (D).

(D) Being in a region of operation where secondary pressure command value Psec_co<primary pressure command value Ppri_co.

It is determined that the condition (D) is satisfied, for example, when the operating state is in the region D indicated by dots in the map of FIG. 4. When it is determined that the termination condition for pressure-equalizing control with secondary pressure is satisfied, the normal line pressure control is then performed.

[2-2. Primary Pressure Control]

Figure 2:
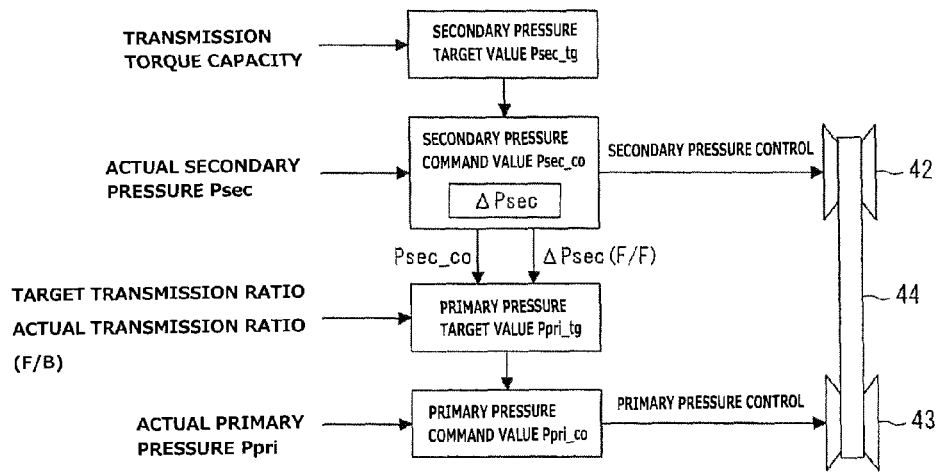
FIG. 2 is a control block diagram of the continuously variable transmission control device according to the embodiment of the present invention.

The present device is configured to perform a specific primary pressure control during the pressure-equalizing control. As shown in FIG. 2, secondary pressure target value Psec_tg is set based on the transmission torque capacity of belt-type continuously variable transmission mechanism 4, and the secondary pressure command value Psec_co is set based on secondary pressure target value Psec_tg and actual secondary pressure Psec. Primary pressure target value Ppri_tg is normally set based on the target transmission ratio and the actual transmission ratio (calculated from rotational speed Npri of primary pulley 42 and rotational speed Nsec of secondary pulley 43) and secondary pressure command value Psec_co, and primary pressure command value Ppri_co is set based on primary pressure target value Ppri_tg and actual primary pressure Ppri.

Accordingly, primary pressure Ppri is basically feedback-controlled based on the actual transmission ratio calculated from rotational speed Npri of primary pulley 42 and rotational speed Nsec of secondary pulley 43. However, during the pressure-equalizing control, as shown in FIG. 7 (*b*), primary pressure Ppri is feedforward-controlled based on difference ΔPsec by: calculating the difference ΔPsec by subtracting the secondary pressure command value Psec_co from actual secondary pressure Psec (at Step S110); determining whether difference ΔPsec is negative (at Step S120); when difference ΔPsec is negative, correcting the primary pressure target value Ppri_tg based on difference ΔPsec; and thereby performing a pressure-equalizing-control-condition correction control to correct the primary pressure command value Ppri_co (at Step S130).

Specifically, as shown in FIG. 2, in this pressure-equalizing-control-condition correction control, when difference ΔPsec is negative, difference ΔPsec is added to primary pressure command value Ppri_co after feedback at the moment, to newly set the primary pressure command value Ppri_co. Since difference ΔPsec to be added is negative, the updated primary pressure command value Ppri_co is a smaller value after reduction. The difference ΔPsec is added, without being corrected, to primary pressure command value Ppri_co, but correction of primary pressure command value Ppri_co is not so limited. When difference ΔPsec becomes greater than or equal to zero, this control (pressure-equalizing-control-condition correction control of primary pressure Ppri) is terminated (at Step S140).

Figure 6:
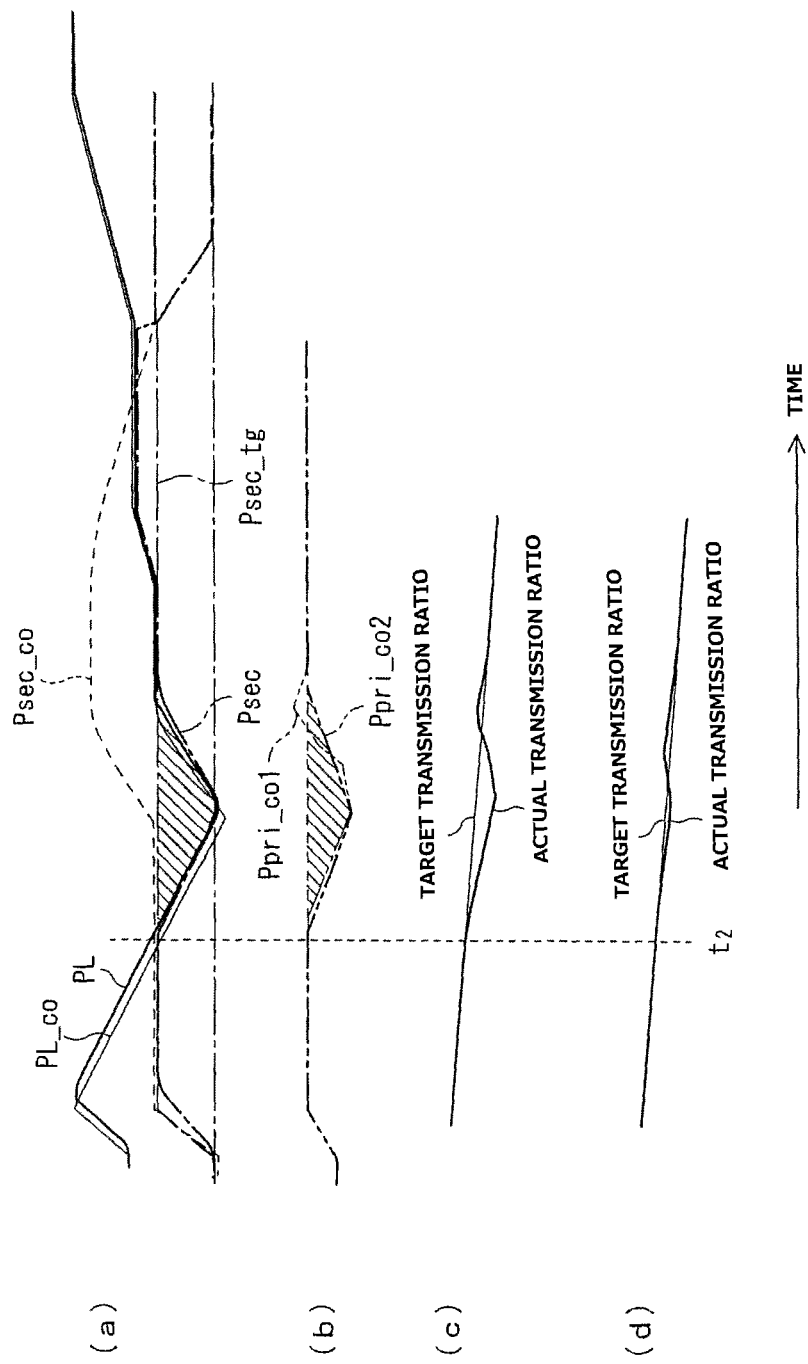
FIG. 6 is a time chart illustrating changes of a transmission ratio which accompany the pressure-equalizing control performed by the continuously variable transmission control device according to the embodiment of the present invention.

FIG. 6 is a time chart illustrating the pressure-equalizing-control-condition correction control of primary pressure Ppri. When difference ΔPsec is negative as shown by diagonally shaded pattern in FIG. 6 (a), primary pressure command value Ppri_co also decreases depending on this difference ΔPsec as shown by diagonally shaded pattern in FIG. 6 (b). In FIG. 6 (b), a narrow long-dashed double-short-dashed line represents primary pulley pressure command value Ppri_co1 when the pressure-equalizing-control-condition correction control is not performed, and a bold long-dashed double-short-dashed line represents primary pressure command value Ppri_co2 when the pressure-equalizing-control-condition correction control is performed.

When the pressure-equalizing-control-condition correction control is not performed, decrease of primary pressure command value Ppri_co is delayed, so that deviation of the actual transmission ratio from the target transmission ratio becomes large, and the transmission ratio fluctuates unstably, as shown in FIG. 6 (c). When the pressure-equalizing-control-condition correction control is performed, decrease of primary pressure command value Ppri_co is made in suitable timing, so that deviation of the actual transmission ratio from the target transmission ratio becomes small, and the transmission ratio is stabilized, as shown in FIG. 6 (d).

[Operation and Effect]

The continuously variable transmission control device and control method according to the embodiment of the present invention is configured as described above, and serves to reduce the line pressure to the required pulley pressure (secondary pressure) by the pressure-equalizing control, and thereby reduce the discharge pressure of the oil pump, and reduce the friction, and thereby enhance the fuel efficiency.

While the pressure-equalizing control is being performed, it is determined that the line pressure PL is equalized with secondary pressure Psec, based on the condition that actual secondary pressure Psec has decreased. This determination causes a decrease of actual secondary pressure Psec, and thereby tends to cause unstable fluctuation of the transmission ratio. However, when actual secondary pressure Psec is reduced to be lower than secondary pressure command value Psec_co, namely, when difference ΔPsec obtained by subtracting the secondary pressure command value Psec_co from actual secondary pressure Psec becomes negative, the pressure-equalizing-control-condition correction control is performed to correct the primary pressure command value Ppri_co based on the difference (quantity of decrease) ΔPsec. This serves to suppress the unstable fluctuation of the transmission ratio, and stabilize the actual transmission ratio close to the target transmission ratio.

Furthermore, after start of the pressure-equalizing-control-condition correction control, the pressure-equalizing-control-condition correction control is terminated in response to a condition that it is determined that actual secondary pressure Psec has decreased and difference ΔPsec becomes positive. This serves to perform required and sufficient correction of primary pressure command value Ppri_co.

During the pressure-equalizing control, it is determined that the actual line pressure PL is equalized with the actual secondary pressure Psec, based on the condition that difference ΔPsec is negative and has a magnitude larger than or equal to the predetermined value (pressure-equalization determination value Pc), wherein the predetermined quantity for raise (increase) of secondary pressure command value Psec_co is set identical to the predetermined value (pressure-equalization determination value Pc), based on the predetermined value (pressure-equalization determination value Pc). This serves to prevent excessive rise of secondary pressure command value Psec_co and perform suitable raising operation. However, it is unnecessary that the predetermined quantity for raise (increase) is set identical to the predetermined value (pressure-equalization determination value Pc).

<Others>

Although the embodiment of the present invention has been described above, the present invention is not limited to the embodiment, but may be carried out with modifications without going out of the substance of the present invention. For example, the correction of primary pressure command value Ppri_co may be implemented not only by adding the difference ΔPsec as it is to primary pressure command value Ppri_co, but also by obtaining a quantity by multiplying the difference ΔPsec by a constant, and adding the quantity to primary pressure command value Ppri_co.

The invention claimed is:

1. A continuously variable transmission control device for a continuously variable transmission, wherein the continuously variable transmission includes a primary pulley at an input side, a secondary pulley at an output side, and a belt wound around the primary pulley and the secondary pulley, the continuously variable transmission control device comprising:
a secondary pressure control section configured to:
set a secondary pressure command value, wherein the secondary pressure command value is a command value of a secondary pressure supplied to the secondary pulley; and
control the secondary pressure on a basis of the secondary pressure command value;
a secondary pressure sensing section configured to sense an actual secondary pressure, wherein the actual secondary pressure is an actual oil pressure supplied to the secondary pulley;
a primary pressure control section configured to:
set a primary pressure command value on a basis of a target transmission ratio, wherein the primary pressure command value is a command value of a primary pressure supplied to the primary pulley; and
control the primary pressure on a basis of the primary pressure command value; and
a line pressure control section configured to:
set a line pressure command value on a basis of one of the secondary pressure command value and the primary pressure command value, wherein the line pressure command value is a command value of a line pressure; and
control the line pressure on a basis of the line pressure command value;
wherein an action is performed while a pressure-equalizing control is being performed during a period from a satisfaction of a predetermined start condition to a satisfaction of a predetermined termination condition, wherein the predetermined start condition includes being in a state of operation where the secondary pressure command value is higher than the primary pressure command value, and wherein the pressure-equalizing control is to equalize an actual oil pressure of the line pressure with the actual secondary pressure; and wherein the action includes:
  causing the line pressure control section to reduce the line pressure command value gradually;
  controlling the line pressure in a manner to conform the actual secondary pressure to the secondary pressure command value, in response to a determination based on a decrease of the actual secondary pressure that the actual oil pressure of the line pressure has become equal to the actual secondary pressure; and
  causing the primary pressure control section to calculate a difference between the secondary pressure command value and the actual secondary pressure by subtracting the secondary pressure command value from the actual secondary pressure, and control the primary pressure by performing a pressure-equalizing-control-condition correction control when the difference is negative, wherein the pressure-equalizing-control-condition correction control includes correcting the primary pressure command value on a basis of the difference.

2. The continuously variable transmission control device as claimed in claim 1, wherein:
  the secondary pressure control section is configured to set the secondary pressure command value on a basis of a required torque transmission capacity; and
  the action, performed while the pressure-equalizing control is being performed, includes:
    causing the secondary pressure control section to perform a raising operation to raise the secondary pressure command value by a predetermined quantity;
    causing the line pressure control section to reduce the line pressure command value gradually, in response to a determination based on the actual secondary pressure that the raising operation is completed;
    causing the line pressure control section to control the line pressure in a manner to conform the actual secondary pressure to the secondary pressure command value, in response to a determination based on a decrease of the actual secondary pressure that the actual oil pressure of the line pressure has become equal to the actual secondary pressure; and
    at and after start of the pressure-equalizing control, causing the primary pressure control section to calculate the difference between the secondary pressure command value and the actual secondary pressure by subtracting the secondary pressure command value from the actual secondary pressure, and perform the pressure-equalizing-control-condition correction control when the difference is negative.

3. The continuously variable transmission control device as claimed in claim 1, wherein the primary pressure control section is configured to implement the pressure-equalizing-control-condition correction control by correcting the primary pressure command value in a manner to reduce the primary pressure command value by adding the difference to the primary pressure command value when the difference is negative.

4. The continuously variable transmission control device as claimed in claim 3, wherein the primary pressure control section is configured to terminate the pressure-equalizing-control-condition correction control in response to a combination of a determination of a decrease of the actual secondary pressure and a condition that the difference has become positive, after start of the pressure-equalizing-control-condition correction control.

5. The continuously variable transmission control device as claimed in claim 2, wherein:
  during the pressure-equalizing control, the determination that the actual oil pressure of the line pressure has become equal to the actual secondary pressure is made in response to a condition that the difference is negative and has a magnitude higher than or equal to a predetermined value; and
  the predetermined quantity to raise the secondary pressure command value is set on a basis of the predetermined value.

6. The continuously variable transmission control device as claimed claim 1, wherein the actual secondary pressure used in each of the controls is a quantity obtained by low-pass filtering a value sensed by the secondary pressure sensing section.

7. A continuously variable transmission control method for a continuously variable transmission, wherein:
  the continuously variable transmission includes a primary pulley at an input side, a secondary pulley at an output side, a belt wound around the primary pulley and the secondary pulley, a secondary pressure control section for controlling a secondary pressure, a primary pressure control section for controlling a primary pressure, a line pressure control section for controlling a line pressure, and a pressure-equalizing control section for performing a pressure-equalizing control to equalize an actual oil pressure of the line pressure with an actual secondary pressure;
  the secondary pressure control section is configured to:
    set a secondary pressure command value on a basis of a required torque transmission capacity, wherein the secondary pressure command value is a command value of the secondary pressure supplied to the secondary pulley; and
    control the secondary pressure on a basis of the secondary pressure command value;
  the primary pressure control section is configured to:
    set a primary pressure command value on a basis of a target transmission ratio, wherein the primary pressure command value is a command value of the primary pressure supplied to the primary pulley; and
    control the primary pressure on a basis of the primary pressure command value;
  the line pressure control section is configured to:
    set a line pressure command value on a basis of one of the secondary pressure command value and the primary pressure command value, wherein the line pressure command value is a command value of the line pressure; and
    control the line pressure on a basis of the line pressure command value; and
  the continuously variable transmission control method comprises:
    performing the pressure-equalizing control during a period from a satisfaction of a predetermined start condition to a satisfaction of a predetermined termination condition, wherein the predetermined start condition includes being in a state of operation where the secondary pressure is higher than the primary pressure;

performing an action during the pressure-equalizing control, wherein the action includes in sequence:
- a secondary pressure raising step of causing the secondary pressure control section to raise the secondary pressure command value by a predetermined quantity;
- a line pressure reducing step of: sensing the actual secondary pressure, wherein the actual secondary pressure is an actual oil pressure supplied to the secondary pulley; and causing the line pressure control section to reduce the line pressure command value gradually, in response to a determination based on the actual secondary pressure that the secondary pressure raising step is completed; and
- a line pressure control step of causing the line pressure control section to control the line pressure in a manner to conform the actual secondary pressure to the secondary pressure command value, in response to a determination based on a decrease of the actual secondary pressure that the actual oil pressure of the line pressure has become equal to the actual secondary pressure; and while the pressure-equalizing control is being performed, causing the primary pressure control section to calculate a difference between the secondary pressure command value and the actual secondary pressure by subtracting the secondary pressure command value from the actual secondary pressure, and control the primary pressure by performing a pressure-equalizing-control-condition correction control when the difference is negative, wherein the pressure-equalizing-control-condition correction control includes correcting the primary pressure command value on a basis of the difference.

* * * * *